United States Patent [19]

Sawdon

[11] Patent Number: 5,627,143
[45] Date of Patent: May 6, 1997

[54] WELLBORE FLUID

[75] Inventor: Christopher A. Sawdon, Par, United Kingdom

[73] Assignee: Dowell Schlumberger Incorporated, Houston, Tex.

[21] Appl. No.: 379,608

[22] PCT Filed: Aug. 30, 1994

[86] PCT No.: PCT/GB94/01878

§ 371 Date: Jan. 31, 1995

§ 102(e) Date: Jan. 31, 1995

[87] PCT Pub. No.: WO95/06695

PCT Pub. Date: Mar. 9, 1995

[30] Foreign Application Priority Data

Sep. 1, 1993 [GB] United Kingdom .......... 9318100
Jun. 29, 1994 [GB] United Kingdom .......... 9413075

[51] Int. Cl.$^6$ .......................... C09K 7/02; C09K 7/06
[52] U.S. Cl. ............................... 507/103; 507/203
[58] Field of Search ....................... 507/103, 203

[56] References Cited

U.S. PATENT DOCUMENTS

| 5,096,883 | 3/1992 | Mercer et al. | 507/103 |
| 5,432,152 | 7/1995 | Dawson et al. | 507/103 |

FOREIGN PATENT DOCUMENTS

| 9469477 | 12/1994 | Australia | C09K 7/06 |
| 9402000 | 12/1994 | Norway | C09K 7/02 |
| 9428087 | 12/1994 | WIPO | C09K 7/06 |

*Primary Examiner*—David B. Springer
*Attorney, Agent, or Firm*—Wolf, Greenfield & Sacks, P.C.

[57] ABSTRACT

There is disclosed a biodegradable wellbore fluid having a continuous oil phase comprising an n-alk-1-ene having from 12 to 20 carbon atoms or a linear polyunsaturated olefin having one of the double bonds in the 1-position and having from 12 to 22 carbon atoms, or a mixture thereof.

12 Claims, No Drawings

WELLBORE FLUID

This application is a 371 of PCT/GB94/01878 filed Aug. 30, 1994.

This invention concerns wellbore fluids suitable for use in the oil and gas exploration and production industries and embraces fluids used for drilling, completion, workover or packing of wellbores. The invention is especially concerned with biodegradable wellbore fluids the liquid phase of which consists of an oil, or of water-in-oil "invert" emulsions, where the oil phase comprises n-alk-1-enes (linear alphaolefins) having from 12 to 20 carbon atoms, or linear polyunsaturated olefins having one of the double bonds in the 1-position and having from 12 to 22 carbon atoms, or mixtures of the two types in any ratio.

A wellbore is drilled by attaching to the bottom of a length of drill pipe a cutting bit which is rotated either by means of a prime mover on the surface which applies rotary motion to the top end of the drill pipe or by means of a turbine motor fixed to the drill pipe near the lower end, the turbine motor being driven by circulating fluid in the wellbore.

In either case a drilling fluid is required to remove cuttings from around the bit and to transport the cuttings to the surface for separation and removal. The drilling fluid also cools the bit and lubricates both bit and drill pipe thus reducing friction.

In many cases it is possible to use as the drilling fluid a simple mixture comprising water and a smectite clay which increases the viscosity of the fluid for the purposes of suspending and transporting the cuttings. However it is often necessary to drill a wellbore through geological formations the constituent materials of which swell or disintegrate on contact with water. In such cases an oil-based drilling fluid is used, that is a fluid in which the liquid phase consists of oil, or of water-in-oil "invert" emulsions.

Such oil based drilling fluids avoid the hydration problems caused by water contacting shale or salt formations. They also possess advantages compared to water based fluids of enhanced lubrication of the drill pipe, inhibition of corrosion of the drill pipe, and high stability at high temperatures.

Originally such oil based drilling fluids utilised diesel fuel or other similar petroleum fractions as the oil phase. However these contain relatively high proportions of aromatic hydrocarbons and other compounds which are toxic to marine life.

More recently, highly refined low aromatic mineral oils have been used. These are of much lower toxicity than diesel fuel. Various environmental authorities therefore permitted the discharge to the sea of cuttings contaminated with "low toxicity" mineral oil based drilling fluids.

However, in many offshore locations, this has caused the smothering of the sea bed with piles of cuttings in which the refined mineral oil has not biodegraded significantly, especially under the anaerobic conditions existing within a pile of cuttings.

This has led to increasingly stringent regulations on the concentration of mineral oils which may be discharged with the cuttings. Also the Paris Convention (Annex A, Part 1) is increasingly restricting the use in drilling fluids of "oils of a petroleum origin" whilst discharging cuttings to the sea.

U.S. Pat. No. 5,068,041 relates to the use of synthetic branched chain polyalphaolefins as a continuous phase for oil based drilling fluids.

GB-A-2258258 describes polyalphaolefins for use in wellbore fluids.

According to the present invention, there is provided a biodegradeable wellbore fluid having a continuous oil phase comprising an n-alk-1-ene having from 12 to 20 carbon atoms or a linear polyunsaturated olefin having one of the double bonds in the 1-position and having from 12 to 22 carbon atoms, or a mixture thereof.

Preferably, the wellbore fluid is substantially free of aromatic hydrocarbons, cycloparaffins, cycloalkenes and iso-alkanes. Thus, the continuous oil phase of the wellbore fluid of the present invention preferably has less than 10%, more preferably less than 5%, by weight of cycloparaffins, iso-paraffins, aromatic compounds and cycloalkenes. It is also preferred that the wellbore fluid contains not more than 35% by weight of branched chain alk-1-enes.

Whilst polyalphaolefins are poorly degradable under anaerobic conditions, they are biodegradeable under some conditions and may therefore be tolerated in the wellbore fluid of the present invention, for example in amounts up to about 50% by volume of the oil phase. In preferred embodiments of the invention, any polyalphaolefin is present in an amount no greater than 20% by volume, more preferably no greater than 10% by volume, and most preferably no greater than 5% by volume.

It has, surprisingly, been found that certain linear olefins do not undergo any detectable reaction or polymerisation in terms of changing the physical properties of a wellbore fluid, even after repeated exposure to very high temperatures (200° C.) and repeated air saturation. Moreover, the terminal unsaturated group, whilst stable to chemical reaction under normal drilling conditions, is reactive enough to promote the ready initiation of biodegradation.

The n-alk-1-enes may be produced synthetically by, for example, the polymerisation of ethylene to yield substantially linear hydrocarbons in the range $C_{12}$–$C_{20}$ chain length containing a terminal unsaturated double bond and containing not more than about 35% by weight of branched chain alk-1-enes.

The n-alk-1-ene is preferably present in the oil phase in an amount of at least 50% by volume.

As mentioned, the oil phase should preferably not contain more than 35% by weight of branched chain alk-1-enes; this is because such compounds are less easily biodegradeable. It is, however, desirable that the oil phase contain a relatively small proportion of such branched alk-1-enes below 35% by weight because of the advantageous properties the confer in terms of pour point.

The linear alphaolefins are preferably obtained by the processing of renewable feedstocks obtained from vegetable oils or animal fats. For example, fatty acids from vegetable sources such as coconut oil or palm kernel oil may be converted to fatty alcohols by reduction or indirectly via the methylester, and the fatty alcohol can be dehydrated to a linear alphaolefin. Branched chain isomers are minimised using natural linear fatty acid feedstocks. An alternative manufacturing method employs the reaction of a linear fatty acid with acetic anhydride at 250° C. in the presence of a palladium or rhodium catalyst to produce high purity linear alphaolefins with minimal internal olefin formation. The linear alphaolefins thus produced contain one fewer carbon atom than the fatty acid feedstock. Thus, for example, a $C_{12}$–$C_{18}$ natural fatty acid mixture feedstock, produces $C_{11}$–$C_{17}$ linear alphaolefins. This reduction in carbon chain length can be advantageous as a lower pour point linear alphaolefin oil is produced.

Because of their low flash point, linear alphaolefins of less than $C_{12}$ chain length should be substantially absent from the oil phase. Thus, linear alphaolefins (produced from natural fatty acid feedstocks) which may contain $C_7$, $C_8$, $C_9$, $C_{10}$, or $C_{11}$ olefins (depending on the feedstock and the manufacturing method) should have these fractions removed by, for example, distillation.

A preferred embodiment of this invention is where the linear alphaolefin oil phase comprises linear alphaolefins having from 12–18 carbon atoms. The linear alphaolefin mixtures in this range possess an advantageous lower pour point than these containing significant quantities of $C_{20}$ or higher linear alphaolefins.

In another embodiment of this invention linear alphaolefins obtained from unsaturated fatty acid feedstocks such as oleic acid contain at least one internal double bond (inherited from the unsaturated fatty acid) as well as the terminal unsaturation introduced in the manufacturing procedure. The presence of at least two double bonds in higher carbon number linear olefin oils leads to a desirable combination of high flash point and lower pour point. For example, an oleic acid feedstock will yield either octadec-1,8,-diene, or heptadec-1,7,-diene by the catalytic process described above. The multiple unsaturation will also provide additional active sites for the initiation of biodegradation.

Surprisingly it has been found that the linear alphaolefin mixtures of the present invention are highly advantageous for use as the continuous liquid phase of biodegradable oil based or invert emulsion wellbore fluids. (Invert emulsion wellbore fluids have a dispersed brine phase emulsified into the oil.)

The wellbore fluids of the present invention may contain added pour-point depressants to reduce the freezing point of the linear alphaolefin mixture when it is desired to utilise the wellbore fluid in a cold environment.

The oil continuous wellbore fluids may be used at oil:water ratios preferably in the range 25:75 to 100:0, where the water phase is in the form of dispersed aqueous droplets in the continuous oil phase ("invert emulsion").

The liquid components of the wellbore fluid according to the invention may comprise an emulsion of a dispersed hydrophilic liquid in the continuous oil phase.

In order to accelerate biodegradation, the wellbore fluid according to the present invention may further include added nutrients. Suitable nutrients include sources of the elements nitrogen, phosphorus and potassium, as well as trace elements such as iron required by bacteria. The nutrient may, for example, be dissolved in the aqueous phase if the wellbore fluid is an invert mud, or dispersed in the oil phase.

The wellbore fluid may also include an electron acceptor, for example, hematite, nitrate salts, and sulphate salts.

The principle of adding nutrients and/or an electron acceptor to a wellbore fluid may be extended to any wellbore fluid having a water-immiscible, or oily phase. Thus, in accordance with a further aspect of the present invention, there is provided a wellbore fluid comprising an oily phase characterised in that the wellbore fluid further comprises sources of one or more of the elements nitrogen, phosphorus and potassium, added as nutrients for the purpose of enhancing biodegradation of the said oil phase of the wellbore fluid. Preferably, the wellbore fluid comprises sources of each of the three elements.

In this aspect of the invention, the oil of the oil phase should be one which is capable of biodegrading in the presence of said nutrients under anaerobic conditions.

In the wellbore fluid of this further aspect of the invention, the wellbore fluid may additionally comprise sources of trace elements required by anaerobic bacteria for effective bigdegradation and may additionally comprise an electron acceptor to aid in bigdegradation.

Other additives which may be contained in the wellbore fluids of the present invention include, but are not limited to emulsifiers and other surface active agents, viscosifiers such as organoclays and polymers, filtration control agents such as gilsonite and organically modified lignite, density increasing agents (or weighting agents) such as powdered barytes or hematite or calcium carbonate, or other wellbore fluid additives known to those skilled in the art.

Other oil miscible and biodegradable liquids such as oil soluble esters or vegetable oils may be included as a minor proportion (for example less than 50% by weight) of the continuous oil phase of the wellbore fluid.

The emulsified water phase of the wellbore fluid may contain dissolved salts such as alkali metal halides (for example sodium chloride), alkaline earth metal halides such as calcium chloride, or other water soluble organic compounds or salts for the purpose of adjusting the water activity of the dispersed aqueous phase (to enhance drilling performance).

The biodegradable wellbore fluids of the present invention are stable under drilling conditions, and have the advantageous properties of low plastic viscosity (as a consequence of the low kinematic viscosity of the linear alphaolefin mixture), low pour point, acceptable flash point, minimal effect on human skin and minimal carcinogenicity, freedom from U.V. fluorescence, and minimal swelling effect on rubber goods.

According to a second aspect of the present invention, there is provided a method of drilling a well wherein the drilling fluid is a wellbore fluid according to the first aspect of this invention. The cuttings which are contaminated with the drilling fluid may be discharged to the ocean floor or land farmed by spreading the cuttings on the land whereupon natural bigdegradation processes effectively remove the oil contamination.

According to a third aspect of the present invention, there is provided the use, as the continuous oil phase of a wellbore fluid, of an n-alk-1-ene having from 12 to 20 carbon atoms or a linear polyunsaturated olefin having one of the double bonds in the 1-position and having from 12 to 22 carbon atoms, or a mixture thereof.

The following examples illustrate the wellbore fluids of the present invention.

The wellbore fluid properties were tested in accordance with API RP 13B-2 1990.

The following abbreviations are used:

KV: The kinematic viscosity of an oil in centistokes.

PV: The plastic viscosity of a drilling fluid (centipoise). Generally low PV is advantageous (as are low KV oils).

AV: The apparent viscosity of a drilling fluid (centipoise).

YP: The yield point (lbs/100 ft$^2$) of the fluid and is a measure of the non Newtonian viscous characteristics.

6 rpm and 3 rpm: Dial readings on the Fann Viscometer which indicate the viscosity at low shear rates. Higher 6 rpm and 3 rpm values indicate greater thixotropy which is generally advantageous.

Gels: A measure of the gelling and suspending characteristics of the fluid (lbs/100 ft$^2$), determined using the Fann viscometer.

ES: Electrical Stability of an emulsion (volts). High numbers imply high stability.

HTHP FL: High Temperature and High Pressure Fluid Loss. A measure of the ease of filtering a drilling fluid through a filter paper under HTHP conditions. Results in milliliters of filtrate. Low filtrate volumes are advantageous.

EXAMPLE 1

Some properties of alk-1-enes of carbon number between 12 and 20 are shown in Table 1 (which appears at the end of this description) and compared with an ester oil, a linear alkyl benzene, and a polyalphaolefin. In Table 1 minor inconsistencies in the data are a function of minor quantities of by-product alphaolefin isomers in the synthetic and naturally derived products. In particular the presence of 35% or less of branched chain terminal olefin in the synthetic $C_{16}$–$C_{20}$ blend results in a substantial decrease in pour point.

A very advantageous combination of low kinematic viscosity, high flash point, and acceptable pour point can be achieved from linear alphaolefin blends of chain length $C_{12}$–$C_{20}$.

A KV of about two centistokes (at 40° C.) is readily achieved in combination with a flash point of over 100° C., and an acceptable pour point of less than 0° C.

The low KV of linear alphaolefins (half that of the linear alkyl benzene, and about one third that of the ester oil and the polyalphaolefin) is a great advantage in that drilling fluids of lower plastic viscosity can be formulated even at high doses of dispersed solids such as barite.

Similarly the low KV allows a higher proportion of emulsified water phase to be used with commensurate cost reductions.

The drilling fluids were all hot rolled in sealed pressure cells for 16 hours at 121° C. prior to testing the fluid properties. The viscous properties were measured at 50° C., and the HTHP FL at 121° C. and 500 psi.

TABLE 1

| OIL TYPE | | KV at 40° C. Cst | Flash Point °C. | Pour Point °C. | Composition Weight % | | | | |
|---|---|---|---|---|---|---|---|---|---|
| | | | | | $C_{12}$ | $C_{14}$ | $C_{16}$ | $C_{18}$ | $C_{20}$ |
| Pure alk-l-enes | $C_{12}$ | 1.29 | 77 | −35 | 100 | | | | |
| | $C_{14}$ | 1.85 | 107 | −13 | | 100 | | | |
| | $C_{16}$ | 2.62 | — | +4 | | | 100 | | |
| | $C_{18}$ | 3.59 | — | +18 | | | | 100 | |
| Synthetic alk-l-ene Blends | $C_{12}$–$C_{14}$ | 1.3 | 81 | −35 | 62.1 | 36.4 | 1.2 | | |
| | $C_{14}$–$C_{16}$ | 1.8 | 113 | −14 | 1.3 | 64.7 | 33.0 | | |
| | $C_{16}$–$C_{20}$ | 2.7 | 135 | −2.0 | | | 1.0 | 55.0 | 36.0 | 10 max. |
| Alk-l-enes from natural feedstock | $C_{12}$–$C_{18}$ Blend | — | 122 | 4.6 | 9.9 | 10.6 | 45.3 | 33.6 | |
| | $C_{16}$–$C_{18}$ Blend | 3.0 | 134 | 5.0 | 0.8 | 3.5 | 59.3 | 33.9 | |
| OCA 2*: $C_{10}$–$C_{12}$ Linear Alkyl Benzene | | 4.0 | 130 | <−70 | | | | | |
| "Finagreen BDMF"*: Ester Oil | | 5.9 | >150 | −23 | | | | | |
| NOVADRILL* Polyalphaolefin (MI Drilling Fluids) | | 3.9–9.6 | 156–172 | <−65 | | | | | |

—Indicates data not available
*Trade name

EXAMPLE 2

An invert emulsion drilling fluid was mixed using as the continuous oil phase a synthetic linear alphaolefin of $C_{14}$–$C_{16}$ chain length ("$C_{14-16}$ LAO"). Its properties were then compared to similar formulations utilising the following alternative oil phases:—linearalkylbenzene (LAB), a polyalphaolefin (PAO) (essentially didecene), Finagreen BDMF™ ester, and a conventional good quality mineral oil (Clairsol 350M)™.

All the fluids were mixed to provide a density of about 1.60 (13.3 lb/gal), and an oil:water ratio of 70:30, with the exception of the ester based fluid which was adjusted to an oil:water ratio of 80:20 because unacceptably high viscosities were obtained at 70:30.

Formulations per m³ of drilling fluid.

| Oil phase | 0.51 m³ |
|---|---|
| Water | 0.22 m³ |
| INTERDRILL EMUL HT* emulsifier | 22.9 kg |
| INTERDRILL LO-RM* rheology modifier | 2.9 kg |
| TRUVIS HT* organoclay viscosifier | 11.4 kg |
| TRUFLO 100* filtration reducer | 5.7 kg |
| Lime | 17.1 kg |
| Calcium Chloride (86.5% purity) | 50.3 kg |
| Barite | 304 kg |

*Mark of Schlumberger Dowell Limited

The results obtained were as follows:

| | Oil Phase | | | | |
|---|---|---|---|---|---|
| Property | $C_{14-16}$ LAO | LAB | PAO | Ester | Mineral Oil |
| PV | 33 | 46 | 50 | 45 | 35 |
| YP | 22 | 25 | 24 | 38 | 28 |
| Gels* | 17/26 | 15/26 | 19/30 | 16/19 | 18/32 |
| 6 rpm/3 rpm | 14/13 | 14/12 | 15/14 | 18/16 | 17/15 |
| HTHP FL | 2.5 | 2.5 | 2.5 | 3.6 | 2.4 |
| ES | 739 | 698 | 609 | 587 | 630 |

*measured at 10 sec/10 min

Whilst the fluids generally display similar characteristics, the fluid based upon the LAO exhibits an advantageously lower plastic viscosity than the other synthetic oil phases, and similar PV to that obtainable with a good quality mineral oil. This allows lower pressure drops on pumping and other benefits during drilling.

EXAMPLE 3

This example illustrates the utilisation of linear alphaolefins obtained by chemical processing of natural fatty acid feedstocks obtained from plant extracts. It also shows the absence of any significant unwanted polymerisation of linearalphaolefin, even on exposure to very high temperatures and repeated oxygen (air) saturation.

A naturally derived linear alphaolefin is Tradenamed "Ginaffin-1218", and is of composition as described in Example 1. It was used as the oil phase in the following drilling fluid formulation of density 2.16 (18 lb/gal), and oil:water ratio 85:15.

Formulation per 350 mls of drilling fluid.

| Ginaffin-1218 | 123 g |
|---|---|
| INTERDRILL EMUL HT | 12.5 g |

| | |
|---|---|
| INTERDRILL OW | 1.5 g |
| TRUVIS HT | 2.5 g |
| TRUDRILL S | 6.0 g |
| Lime | 12.0 g |
| Calcium Chloride (86.5%) | 14.3 g |
| Water | 29.5 g |
| Barite | 555.0 g |

The fluid was fully air saturated by virtue of high shear mixing, with an air vortex, using a Silverson mixer.

The fluid properties were measured prior to heat ageing the fluid in hot rolling cells at 204° C. for 16 hours. The properties were then again measured. The same fluid was then air saturated again and heat aged at 204° C. for another 16 hours prior to re-testing. Another two cycles of air saturation and heat ageing at 204° C. for 16 hours were then performed.

Properties After Repeated Air Saturation/Heat Ageing

| Cumulative Total Heat Ageing Time Hours | AV | PV | YP | Gels | ES | HTHP FL |
|---|---|---|---|---|---|---|
| 0 | 80 | 56 | 48 | 23/40 | 1789 | — |
| 16 | 89 | 79 | 20 | 4/10 | 468 | — |
| 32 | 92 | 82 | 20 | 6/8 | 383 | — |
| 48 | 90 | 80 | 20 | 4/5 | 440 | — |
| 64 | 81 | 72 | 18 | 4/6 | 405 | 2.0 |

The viscous properties were measured at 50° C., and the HTHP FL at 178° C. and 500 psi.

The initial change in viscous properties (increase in PV and decrease in gels) is caused simply by a reduction in the structure forming characteristics of the fluid (action of heat on the TRUVIS HT organoclay).

In real terms, the apparent viscosity of the fluid remains essentially constant throughout the test, demonstrating the absence of unwanted polymerisation of the linear alphaolefin, even at very high temperature.

The results also show that drilling fluids of excellent performance can be made using linear alphaolefins derived from natural fatty acid feedstocks.

In contrast, emulsions weighted to this density, which are based upon esters such as 2-ethylhexyl oleate or 2-ethylhexyl laurate, display extremely high viscosities because of the much higher kinematic viscosity of the ester than the linear alphaolefin. Even more importantly, such ester based fluids undergo irreversible breakdown and further large viscosity increases on exposure to high temperatures such as 350° F. (178° C.) or 400° F. (204° C.). This is caused by hydrolysis of the ester.

EXAMPLE 4

A hydrogenated nitrile elastomer sample, typical of one used in rubber seals, diaphragms and the like in a drilling fluid circuit, was exposed to $C_{14-16}$ linear alphaolefin for seven days at 85° C. Similar tests were conducted for some other known base oils. The change in the rubber hardness and the volume of the samples was measured after exposure. The results are expressed in terms of percent change from the initial unaged value.

| OIL TYPE | $C_{14-16}$ LAO | LAB | 2-ethylhexyl oleate | Mineral Oil |
|---|---|---|---|---|
| Hardness | −9.0 | −30.0 | −11.0 | −7.0 |
| Volume | 4.1 | 14.2 | 10.2 | 4.0 |

The $C_{14-16}$ linear alphaolefin has small effect on the elastomer, similar in magnitude to a conventional good quality mineral oil. The linearalkylbenzene, and the 2-ethylhexyl oleate have undesirable greater swelling and softening effects.

EXAMPLE 5

A sample of $C_{14-16}$ linear alphaolefin was placed under ultraviolet illumination and its visible fluorescence noted. The fluorescence was compared to that of some other known base oils.

| SAMPLE | $C_{14-16}$ LAO | 2-ethylhexyl oleate | CLAIRSOL 350 M | DIESEL FUEL |
|---|---|---|---|---|
| FLUO-RESCENCE | None | Medium white | Medium blue white | Strong White |

The absence of UV fluorescence is of advantage in allowing the detection of even small amounts of fluorescent crude oil in drilled rock samples.

EXAMPLE 6

A drilling fluid based on $C_{14-16}$ linear alphaolefin oil was formulated to a density of 1.20 (10 lb/gal) and an oil:water ratio of 80:20.

The marine toxicity was tested to two organisms: *Skeletonema costatum* (marine algae) and *Acartia tonsa* (a herbivore).

| Species | Result |
|---|---|
| *Skeletonema costatum* | >10,000 mg/l $EC_{50}$ (72 hour) |
| *Acartia tonsa* | >10,000 mg/l $LC_{50}$ (48 hour) |

The wellbore fluid according to this invention is of very low marine toxicity.

EXAMPLE 7

The same drilling fluid based on $C_{14-16}$ linear alphaolefin as used in Example 6 was also tested for biodegradation under aerobic conditions and anaerobic conditions. The test procedures were OECD 301C (28 day) for the aerobic test, and ECETOC 28 for the anaerobic biodegradability test.

| | BIODEGRADATION % |
|---|---|
| AEROBIC (OECD 301C) | 70.0 |
| ANAEROBIC (ECETOC 28) | 53.1 |

The drilling fluid may thus be described as readily biodegradable.

For comparison, mineral oils, and branched polyalphaolefins such as polybutenes are known not to biodegrade significantly under anaerobic conditions. This is a consequence of the high branched and cyclic hydrocarbon fraction in mineral oils, and the absence of active sites such as an olefin group to help initiate biodegradation.

EXAMPLE 8

In this example the test procedure determines anaerobic biodegradation at the high levels of organic loading typical of piles of cuttings accumulated on the sea bed after discharge from a drilling operation. This is in contrast to the very low concentrations used in the ECETOC 28 test.

Sealed opaque containers were fitted with a gas exit tube leading to gas volume measurement in graduated cylinders by water displacement. The containers were charged with a layer of quartz grit (simulated cuttings) covered with a drilling fluid, of formulation similar to that of Example 6, such that the cuttings contained 100 g oil phase per kg of dry cuttings. The cuttings layer was inoculated with a small quantity of sea bed (estuary) sediment dug from below the surface and rich in anaerobic bacteria. The cuttings were covered with sea water, the pot sealed, and the gas collection fitted. The apparatus was maintained at 25° C.

Gas produced by the breakdown of the drilling fluid was monitored versus time over a long period. A comparison was made between drilling fluids based on various oil phases as shown in the table. The results show the total volume (mls) of gas evolved after 393 days.

| Base oil phase | Volume of gas (ml) |
| --- | --- |
| Mineral oil | 31 |
| Linearalkylbenzene | 10 |
| 2-ethylhexyl laurate ester | 232 |
| Linear alphaolefin | 322 |
| Linear alphaolefin + nutrients (3.1 g Ammonium sulphate + 2.4 g potassium dihydrogenphosphate) | 659 |

As expected the mineral oil and the linearalkylbenzene have biodegraded very little. The linear alphaolefin wellbore fluid has biodegraded more quickly than a comparable ester based formulation. The presence of nutrients (here ammonium sulphate and potassium dihydrogen phosphate) has more than doubled the rate of degradation of the linearalphaolefin fluid.

I claim:

1. A biodegradable wellbore fluid which is an emulsion of a dispersed hydrophilic liquid in a continuous oil phase comprising at least 50% by weight of the oil phase of an n-alk-1-ene having from 12 to 20 carbon atoms or a linear polyunsaturated olefin having one of the double bonds in the 1-position and having from 12 to 22 carbon atoms, or a mixture thereof, wherein the oil phase contains less than 10% by weight of aromatic hydrocarbons, cycloparaffins, cycloalkenes, iso-alkanes, no more than 35% by weight of branched chain alk-1-enes, and no more than 20% by volume of polyalphaolefins.

2. A wellbore fluid according to claim 1 in which the olefin oil phase is derived and selected from the chemical processing of the group consisting of natural fats, vegetable oils, naturally derived fatty acids, or naturally derived fatty alcohols.

3. A wellbore fluid according to claim 1, further comprising a pour point depressant.

4. A wellbore fluid according to claim 1, further comprising nutrients added to accelerate biodegradation.

5. A wellbore fluid according to claim 1, further comprising an electron acceptor which is chosen to accelerate anaerobic biodegradation.

6. A wellbore fluid according to claim 5, wherein the electron acceptor is water soluble and selected from the group consisting of hematite, nitrate salts, and sulphate salts.

7. A wellbore fluid according to claim 1, further comprising an oil miscible liquid as a minor proportion of less than 50% by weight of the continuous oil phase of the wellbore fluid.

8. A wellbore fluid according to claim 1, further comprising one or more additives selected from the group consisting of emulsifiers and other surface active agents, viscosifiers, filtration control agents, or density increasing agents.

9. A method of drilling a well comprising, attaching a cutting bit to a length of drill pipe, rotating said cutting bit, removing cuttings from around said bit with a drilling fluid wherein the drilling fluid is a biodegradable wellbore fluid which is an emulsion of a dispersed hydrophilic liquid in a continuous oil phase comprising at least 50% by weight of the oil phase of an n-alk-1-ene having from 12 to 20 carbon atoms or a linear polyunsaturated olefin having one of the double bonds in the 1-position and having from 12 to 22 carbon atoms, or a mixture thereof, wherein the oil phase contains less than 10% by weight of aromatic hydrocarbons, cycloparaffins, cycloalkenes, isoalkanes, no more than 35% by weight of branched chain alk-1-enes, and no more than 20% by volume of polyalphaolefins.

10. The use, as the continuous oil phase of a wellbore fluid, of an oil comprising an n-alk-1-ene having from 12 to 20 carbon atoms or a linear polyunsaturated olefin having one of the double bonds in the 1-position and having from 12 to 22 carbon atoms, or a mixture thereof.

11. A wellbore fluid comprising an oily phase characterized in that the wellbore fluid further comprises sources of one or more elements selected from the group consisting of nitrogen, phosphorous and potassium, added as nutrients for the purpose of enhancing biodegradation of said oil phase of the wellbore fluid.

12. A wellbore fluid according to claim 1, further comprising an electron acceptor, added for the purpose of enhancing biodegradation of said oil phase of the wellbore fluid.

* * * * *